(12) United States Patent
Patel

(10) Patent No.: US 8,976,945 B2
(45) Date of Patent: Mar. 10, 2015

(54) VISUAL IVR DIRECTORY SYSTEM

(71) Applicant: Rupesh Jayesh Patel, East Brunswick, NJ (US)

(72) Inventor: Rupesh Jayesh Patel, East Brunswick, NJ (US)

( * ) Notice: Subject to any disclaimer, the term of this patent is extended or adjusted under 35 U.S.C. 154(b) by 25 days.

(21) Appl. No.: 13/671,557

(22) Filed: Nov. 8, 2012

(65) Prior Publication Data

US 2014/0126707 A1   May 8, 2014

(51) Int. Cl.
*H04M 11/00* (2006.01)
*H04M 3/493* (2006.01)

(52) U.S. Cl.
CPC ................................. *H04M 3/4931* (2013.01)
USPC .................... 379/88.18; 379/88.22; 379/88.23

(58) Field of Classification Search
CPC ............ H04M 3/53325; H04M 3/533; H04M 3/42059; H04M 3/493
USPC ................. 379/88.18, 88.22, 88.23
See application file for complete search history.

(56) References Cited

U.S. PATENT DOCUMENTS

2013/0022191 A1\* 1/2013 Or-Bach et al. .......... 379/218.01

\* cited by examiner

*Primary Examiner* — Simon King

(57) ABSTRACT

Disclosed is a visual IVR directory system for enabling a user to telephonically interact with organizations, the IVR system comprising a database comprising a plurality of organization entries wherein, each organization entry represents a organization registered therewith, each organization entry associated with at least one phone number and an visual IVR menu file, the execution of which leads to the display of a visual IVR menu comprising a plurality of graphical menu icons, the selection of each displays either a graphical submenu, organization information, or establishes an telephonic connection between the user and the organization, the IVR system configured such that, upon determining that a phone number dialed from a telephonic device of the user is listed within the database, the corresponding visual menu file is retrieved from the database and executed on the telephonic device, the telephonic device equipped with a display means.

13 Claims, 5 Drawing Sheets

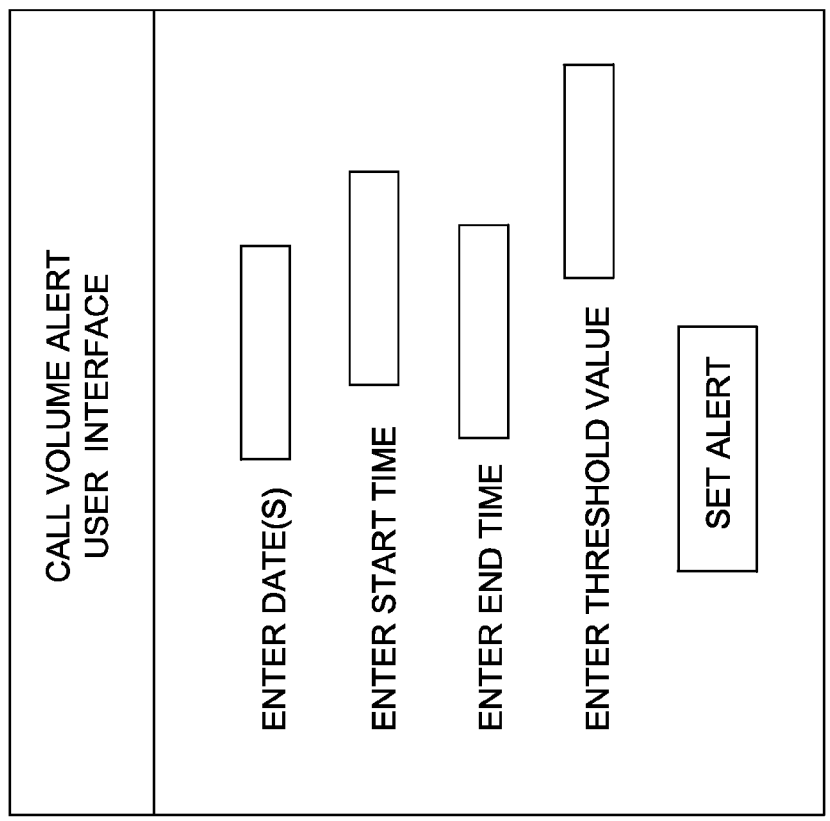

VISUAL IVR DIRECTORY SYSTEM

CROSS-REFERENCE TO RELATED APPLICATION

This application claims benefit of priority of U.S. Provisional Patent Application Ser. No. 61/557,825, filed Nov. 9, 2011, entitled "Interactive GUI Response System", owned by the assignee of the present application and herein incorporated by reference in its entirety.

BACKGROUND

The present invention relates to Interactive Voice Response (IVR) systems, more particularly to visual IVR systems that display IVR menu on capable user terminals, and even more particularly to a third-party visual IVR directory system that serves multiple IVR-enabled organizations and general public that seek information therefrom.

Conventional IVR systems demand listeners (or users) to pay undivided attention while listening to the voice menus thereof. And sometimes, the user might even have to remember the menu options with their respective keys. Any lapse of attention on the part of a user would mean that the voice menu has to be 'taken from the top.' Another setback is the amount of time the user needs to wait till the menu option of his/her choice arrives, which could be forever given the complex and lengthy menus and submenus. Yet another setback is yet another inconvenient requirement on the part of the user to lower his/her telephonic device every time he/she needs press a key in response to voice menu and submenu options so as to navigate therethrough. These only lead to the frustration to the user instead of delivering a quick prompt service. But thanks to today's communication networks and smartphones, visual IVR systems are not far away.

However, even though there is a promise of visual IVR systems in the near future, there still is no solution to coping up with the lengthy call queues or call wait times. During peak times, the users might even need to wait for times longer than usual before being responded to. Although, some IVR systems today provide call wait times and queue lengths, still the user cannot completely relax as what is provided by IVR systems are approximates and therefore, it is incumbent on the user to still be on his/her guard. There is surely a need in the art for such a visual IVR system that alerts the user at an appropriate time so that, the user can meanwhile carryout his/her activities. There is also a need in the art for such a visual IVR system that offers activity options for the user to be engaged during the annoying call wait times. Yet another desirable visual IVR system would be the one that alerts the user of a time when the call volume to an IVR system is low.

SUMMARY

The present invention comprises a visual IVR directory system that serves multiple IVR-enabled organizations and general public (or users) that seek information from the organizations. The visual system comprises a database comprising a plurality of organization entries wherein, each organization entry, which represents an organization, is associated with at least one phone number and an executable visual IVR menu file thereof. The visual system is accessed from a user terminal (such as, a smartphone) via a computer IVR application installed thereon. When a call is placed to an organization (listed in the database) from the user terminal, the corresponding visual IVR menu file is retrieved from the database and is executed so as to render the display of the navigable visual IVR menu. The IVR application is associated with other applications on the user terminal such that, during call wait times, the user is offered to access any of the associated applications during the wait time. An alert is issued when the call wait time or queue length reaches a minimum threshold.

Other objects and advantages of the embodiments herein will become readily apparent from the following detailed description taken in conjunction with the accompanying drawings.

BRIEF DESCRIPTIONS OF THE DRAWINGS

FIG. 5 is a screenshot of the call volume alert user interface according to an embodiment of the present invention.

FIGURES—REFERENCE NUMERALS

10 . . . Visual IVR Directory System
12 . . . Database
14 . . . Phone Number Module
16 . . . Retrieval Module
18 . . . Execution Engine
20 . . . User Terminal
22 . . . Telephonic User Interface
24 . . . Application User Interface
26 . . . Search Module

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention comprises a visual IVR directory system (hereinafter, "IVR system"), which may be best run as a third-party service provider catering to organizations and general public (hereinafter, "users") that seek information therefrom. The IVR system of the present invention not only replaces the commonplace aural Interactive Voice Response (IVR) menu with a visual menu, but also brings together multiple IVR-enabled organizations into a directory setup thereby providing a scope for providing additional value to the users, which will be discussed in the following body of text. The IVR system is configured to be accessed from a user terminal, such as a smartphone, tablet, and the like, which is naturally equipped with a display means—a display screen—capable of displaying computer-generated graphical content.

More particularly, the IVR system can be accessed from the user terminal via a computer IVR application installed thereon. The IVR system is accessed over a communication network such as, the Internet, a cellular network, or a combination thereof.

Figure 1:
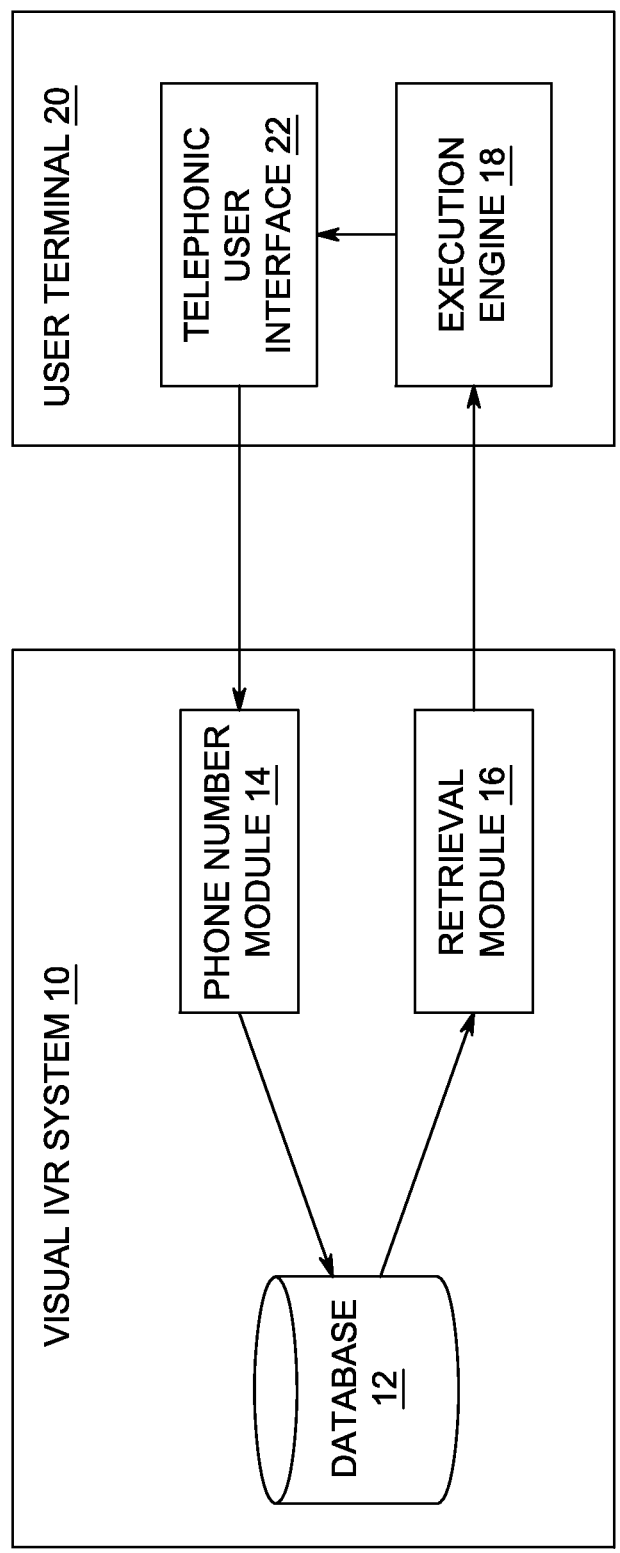
FIG. 1 is a block diagram depicting the components of the visual IVR system and the user terminal, and the functional arrangement therebetween according to the preferred embodiment of the present invention.

Referring to FIG. 1, the IVR system 10 comprises a registration module (not shown), a database 12, a phone number module 14, and a retrieval module 16. The registration module enables an organization to register with the IVR system 10 upon which, the organization is enabled to avail the service(s) thereof. The registration module comprises a registration user interface comprising a plurality of input fields for receiving the basic information of the organization. The input may additionally comprise routing the information directly from the organization's server to the database 12 so that, when changes are made in the organization's server, the same are automatically reflected in organization's account in the IVR system 10. Additionally, a registration fee might have to be paid by the organization towards the registration thereof. The information input from the organization is stored in the database 12.

Figure 2:
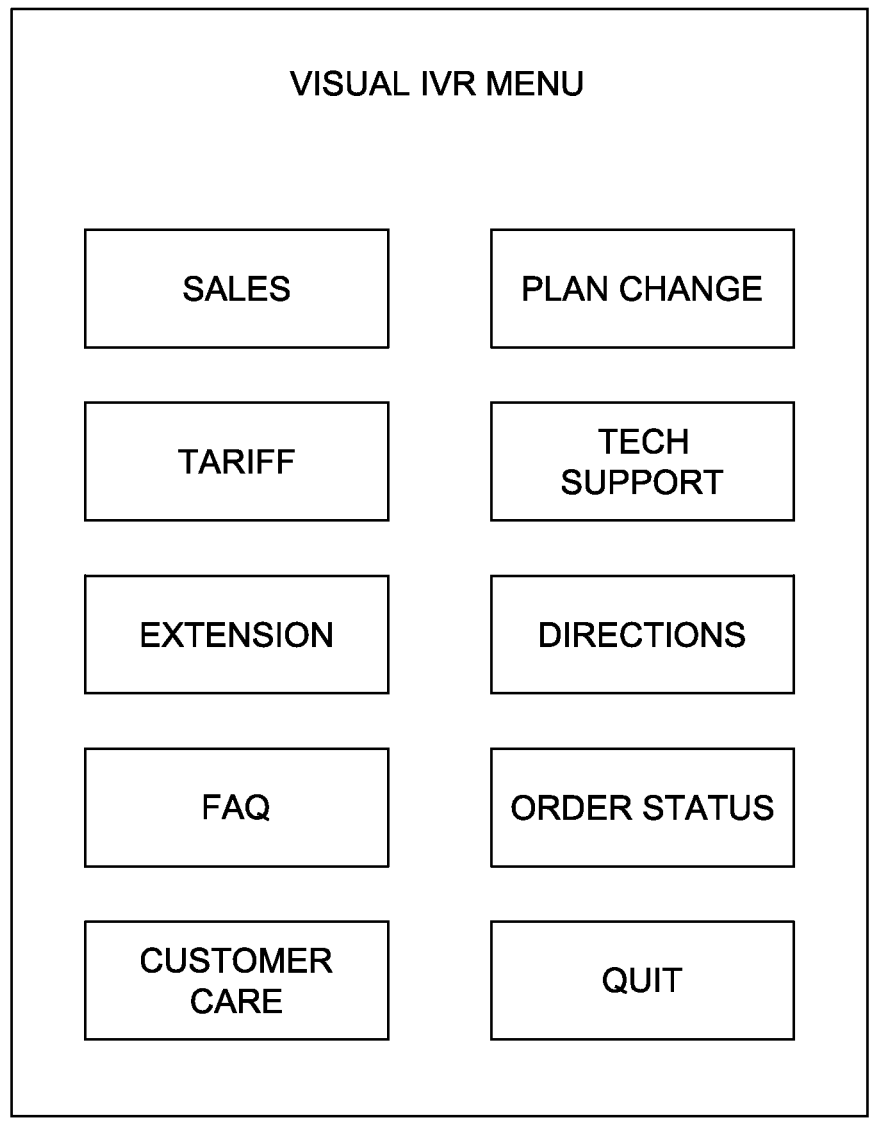
FIG. 2 is a screenshot of a visual IVR menu according to an embodiment of the present invention.

Still referring to FIG. 1, the database 12, more particularly, comprises a plurality of organization entries wherein, each organization entry represents a registered organization. Each organization entry is associated with at least one phone number and a visual IVR menu file, both pertaining to the corresponding organization. The visual menu file is executable by an execution engine 18, which may be pre-installed in the user terminal 20 or may be installed along with the IVR application. The visual menu file, upon the execution thereof, is adapted to render a display of navigable telephonic visual IVR menu comprising a plurality of graphical menu icons on the display of the user terminal 20. The selection of each menu icon in turn leads to the display a telephonic submenu, organization information or the establishment of telephonic connection between a user and the organization. An exemplary visual menu is shown in FIG. 2. Notably, no two visual menus are identical as they are designed based on the respective organizational needs and suitability.

Still referring to FIG. 1, the phone number module 14 and the retrieval module 16 are processing modules that function in conjunction with each other. More particularly, the phone number module 14 is connected between the telephonic user interface 22 and the retrieval module 16, whereas, the retrieval module 16 is connected between the phone number module 14 and the execution engine 18. The telephonic user interface 22 may simply comprise a dial screen thereof, where the user can input a phone number and dial the same. The telephonic user interface 22 is associated with the phone module 14 such that, the latter 14, in response to a phone number being dialed, parses for the phone number within the database 12 for a match. Upon match, the corresponding organization entry is retrieved by the retrieval module 16 along with details associated therewith, which includes the corresponding visual menu file. The retrieved visual menu file is executed by the execution engine 18 rendering the display of the visual menu thereof on the display screen of the user terminal 20.

Figure 3:
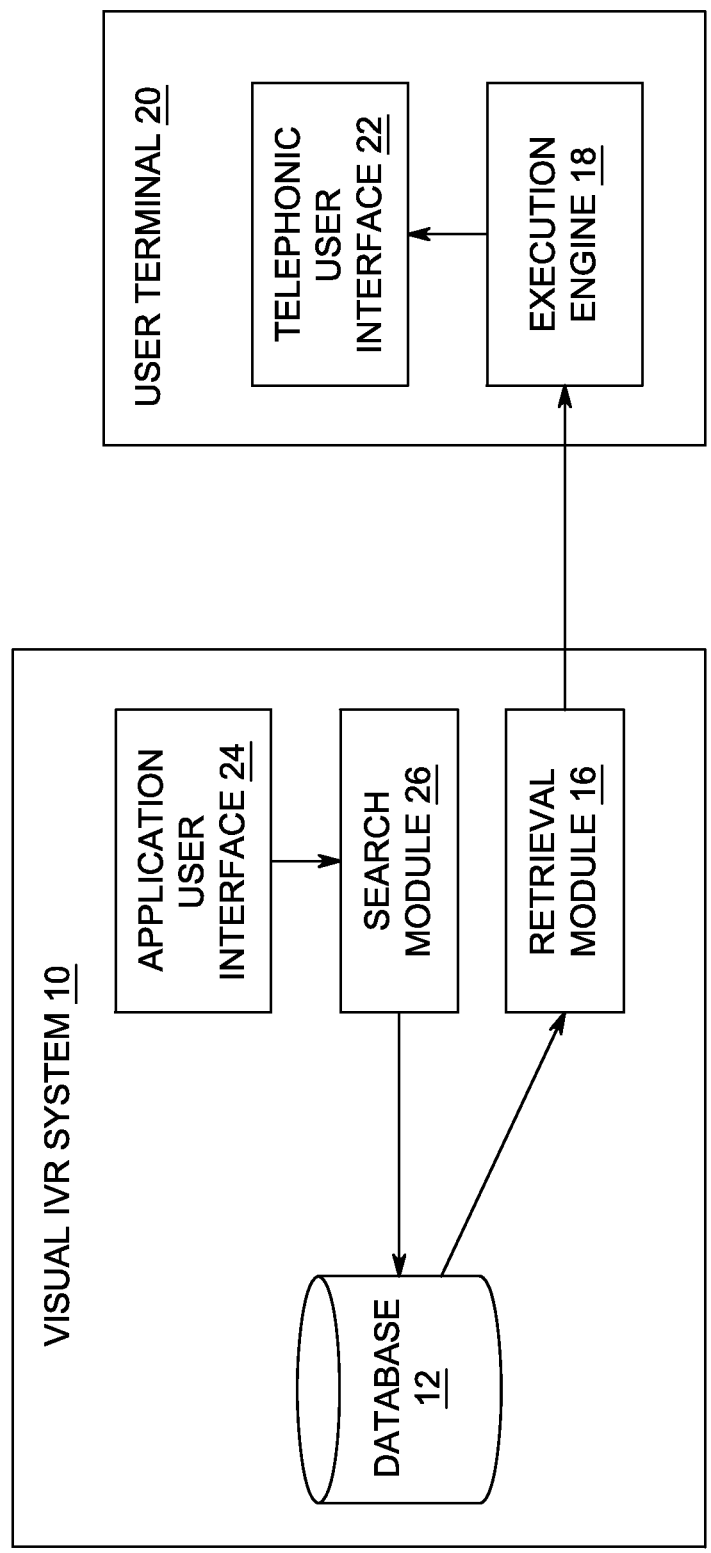
FIG. 3 is a block diagram depicting the components of the visual IVR system and the user terminal, and the functional relationship therebetween according to an embodiment of the present invention.

Referring to FIG. 3, the IVR system 10 further comprises an application user interface 24 and a search module 26 wherein, the application user interface 24 and the search module 26 are in communication with each other. The application user interface 24, which is accessed from the IVR application on the user terminal 20, comprises a search field for receiving a search term or number. The database 12 is parsed for the inputted search term or number by the search module 26 for a match of an organization entry. Upon match, the organization entry retrieved by the retrieval module 16 and the visual menu file associated therewith is executed by the execution engine 18 displaying the visual menu on the display of the user terminal 20.

Figure 4:
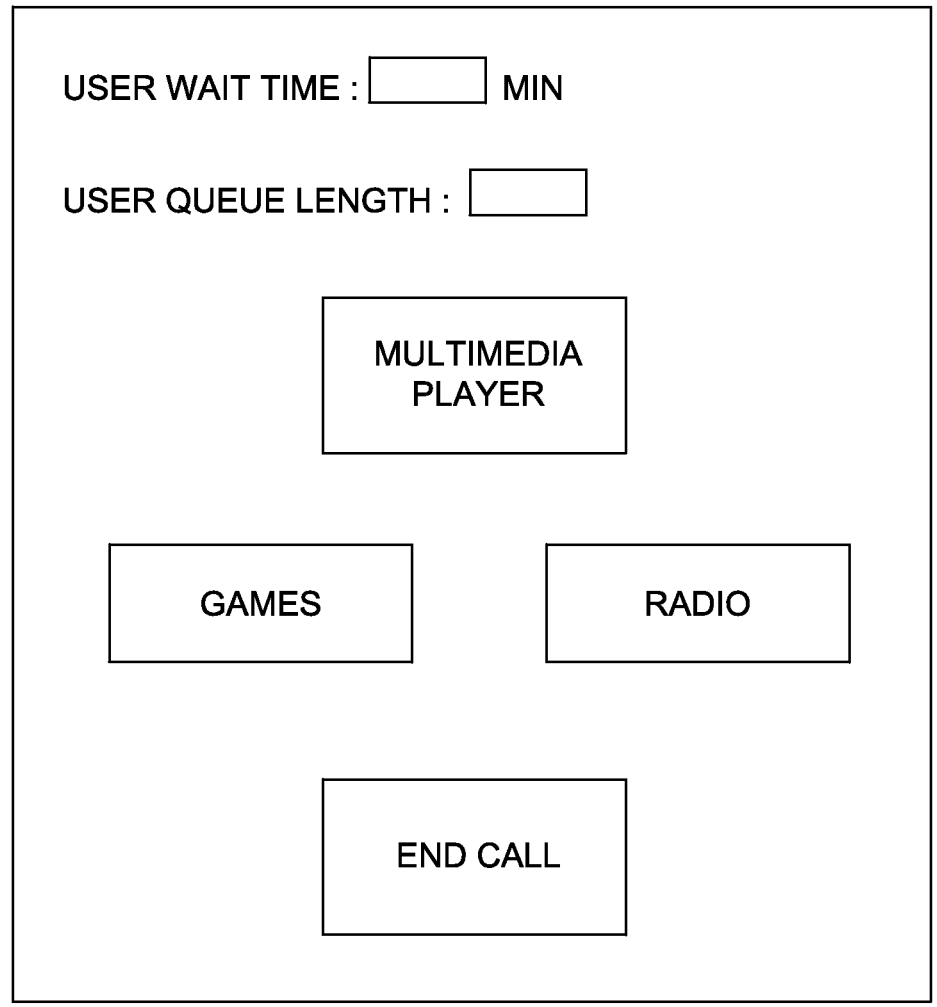
FIG. 4 is a screenshot rendered by call wait module in response to the organization information according to an embodiment of the present invention.

The IVR system further comprises a call wait module, which is configured to activate in response to the organization information obtained from the visual menu. The organization information comprises call wait information comprising either call wait time, queue length, or both. The call wait time is the time the user has to wait before receiving a response to his/her request placed via the visual menu whereas, the queue length refers to the number of fellow users who are to be serviced before the user. The call wait module is associated with a plurality of onboard applications of the user terminal such as multimedia player, game engine, radio, and etc, whereby, a user is provided an option to access any of the plurality of applications during the wait time. An exemplary screenshot offering the user a plurality of applications during the wait time is shown in FIG. 4. Further an alert, preferably an aural alert, is issued by the call wait module if the call wait time, the queue length, or both, reaches a predetermined minimum threshold. For example, an alert is issued if the wait time is one minute. In another example, the alert is issued if there is only one fellow user before the user. At this point, the application is preferably paused and the user terminal is connected back to the IVR system so as to enable the user to proceed with the call placed to the IVR system.

The IVR system further comprises a call volume alert module for alerting the user upon the call volume of an organization reaches a threshold value, which incidentally is to be set by the user himself/herself. The call volume alert module comprises a call volume alert user interface, which is accessible from the application user interface. Referring to FIG. 5, the call volume alert user interface comprises a date input field for receiving at least one date on which, the user wishes to receive the alert. Each date input field is further associated with two time input fields viz., a start and an end time input field for receiving respectively the start and end times within which, the user wishes to receives the alert. The call volume user interface further comprises a call volume threshold value field for receiving a call volume threshold value. The call volume alert module is configured such that, an alert is issued upon meeting the alert criteria (date, start time, end time, and threshold value) set by the user. The call volume alert module is preferably associated with both the display and the speaker of the user terminal so that, a visual alert notification along with an aural indication is issued upon meeting the alert criteria. In one embodiment, a call link may be provided along with the alert message wherein, upon the selection of the call link, the user is directed the IVR system of the corresponding organization.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A visual IVR directory system for enabling a user to telephonically interact with organizations registered therewith, the IVR system comprising a database comprising a plurality of organization entries wherein, each organization entry represents a registered organization, each organization entry associated with at least one phone number and an visual IVR menu file wherein, the execution of a visual menu file leads to the display of a navigable visual IVR menu comprising a plurality of graphical menu icons, the selection of each graphical menu icons displays either a graphical telephonic submenu, organization information, or establishes an aural telephonic connection between the user and the organization, wherein the organization information activates a call wait module to provide a call wait information while establishing the aural telephonic connection, such that the user may initiate an activity in response to the call wait information, wherein the IVR system configured such that, upon determining that a phone number dialed from a telephonic device of the user pertains to an organization entry listed within the database, the visual menu file pertaining to the organization entry is retrieved from the database and executed on the telephonic device so as to display the visual IVR menu on a graphical display means, the telephonic device is equipped with.

2. The visual IVR directory system of claim 1 wherein, the display means comprises a display screen.

3. The visual IVR directory system of claim 1, comprises an execution engine for executing a visual menu file, the engine installed within the telephonic device.

4. The visual IVR directory system of claim 1, comprising: (a) a user interface; and (b) a search module in communication with the database for enabling a user, via the user interface, to search for and retrieve the phone numbers of the registered organizations.

5. The visual IVR directory system of claim 4 wherein, the database is searchable by phone numbers and organizations.

6. The visual IVR directory system of claim 1 wherein, each organization entry is further associated with at least one web-link, which when selected, opens the website of the corresponding organization.

7. The visual IVR directory system of claim 1 comprising: (a) a phone number module for determining whether or not a phone number dialed from the telephonic device pertains to an organization entry listed in the database; and (b) a retrieval module for retrieving the visual menu file upon determining that the phone number dialed pertains to an organization entry listed within the database.

8. The visual IVR directory system of claim 1 wherein, the call wait information comprises: (a) wait time comprising the duration of time the user needs to wait before receiving a response from the organization; or (b) length of queue comprising the number of fellow users that in queue before the users; or (c) wait time and length of queue.

9. The visual NR directory system of claim 1 wherein, the activity comprises launching a music player within the telephonic device.

10. The visual IVR directory system of claim 1 wherein, the activity comprises launching a game within the telephonic device.

11. The visual IVR directory system of claim 1 wherein, the activity comprises a launching radio within the telephonic device.

12. The visual IVR directory system of claim 1 wherein, the activity comprises displaying promotions.

13. A visual IVR system for enabling a user to telephonically interact with organizations registered therewith, the IVR system comprising a database comprising a plurality of organization entries wherein, each organization entry represents a registered organization, each organization entry associated with at least one phone number and an visual IVR menu file wherein, the execution of a visual menu file leads to the display of a navigable visual IVR menu comprising a plurality of graphical menu icons, the selection of each graphical menu icons displays either a graphical telephonic submenu, organization information, or establishes an aural telephonic connection between the user and the organization, wherein the organization information activates a call wait module to provide a call wait information while establishing the aural telephonic connection, such that the user may initiate an activity in response to the call wait information, wherein the IVR system configured such that, upon determining that a phone number dialed from a telephonic device of the user pertains to an organization entry listed within the database, the visual menu file pertaining to the organization entry is retrieved from the database and executed on the telephonic device so as to display the visual IVR menu on a graphical display means, the telephonic device is equipped with, and wherein the IVR system further comprises a call volume alert module for alerting a user upon a call volume to the organization reaches a call volume threshold value, the call volume alert module comprising an alert user interface, the alert user interface comprising: at least one date input field for inputting at least one date on which the user wishes to receive an alert, a time input fields for inputting start and end times for each of the inputted at least one date, the start and end times within which the user wishes to receive the alert, and a volume input field for inputting call volume threshold value; wherein, the call volume alert module is configured to alert the user upon the call volume of the organization during inputted dates and within the inputted times reaches a threshold value.

* * * * *